US005357396A

United States Patent [19]

Alm

[11] Patent Number: 5,357,396

[45] Date of Patent: Oct. 18, 1994

[54] EARTH DISCHARGE CARRIER

[76] Inventor: Per V. Alm, Rönnvägen 3, Växjö , Sweden, S-350 52

[21] Appl. No.: 945,974

[22] PCT Filed: May 4, 1990

[86] PCT No.: PCT/SE90/00292

§ 371 Date: Nov. 4, 1992

§ 102(e) Date: Nov. 4, 1992

[87] PCT Pub. No.: WO91/17560

PCT Pub. Date: Nov. 14, 1991

[51] Int. Cl.[5] .................................... H02B 1/16

[52] U.S. Cl. .................................... 361/212; 361/220

[58] Field of Search ............... 361/212, 213, 214, 215, 361/216, 217, 218, 219, 220, 221, 222, 230; 174/5 R, 55 G, 6; D14/114, 115

[56] References Cited

U.S. PATENT DOCUMENTS

| | | | |
|---|---|---|---|
| 4,321,653 | 3/1982 | Takahashi | 361/219 |
| 4,333,123 | 6/1982 | Moulden | 361/213 |
| 4,468,702 | 8/1984 | Jandrell | 361/212 |
| 4,586,106 | 4/1986 | Frazier | 361/212 |
| 4,745,517 | 5/1988 | Pitts | 361/212 |
| 4,745,518 | 5/1988 | Fang | 361/220 |
| 4,848,353 | 7/1989 | Engel | 128/640 |
| 4,849,851 | 7/1989 | Cubbison, Jr. | 361/220 |
| 4,862,315 | 8/1989 | Cubbison, Jr. | 361/212 |
| 4,981,544 | 1/1991 | Nordale | 361/221 |
| 4,985,719 | 1/1991 | Tsurukawa et al. | 361/212 |
| 5,289,336 | 2/1994 | Gagliano | 361/220 |

FOREIGN PATENT DOCUMENTS

| | | | |
|---|---|---|---|
| 457583 | 1/1989 | Sweden . | |
| 2133935 | 8/1984 | United Kingdom | 361/212 |

*Primary Examiner*—A. D. Dellinen
*Assistant Examiner*—Peter Ganjoo
*Attorney, Agent, or Firm*—Jacobson, Price, Holman & Stern

[57] ABSTRACT

Earth discharge carrier intended to dampen and discharge electrostatical fields from a monitor screen (2), a keyboard or similar object, and also to reduce existing magnetic fields emitted from a monitor screen (2), the object (2) from which discharge is intended to be carried out being given an electrically conductive layer (7) by application of a substantially liquid antistatic medium, from which electric discharge to an earth connection point is carried out by means of an earth discharge carrier located adjacent to the layer, electrically connected to an earth connection point by means of electric conductor (3) connected to the earth discharge carrier (1). According to the invention, the earth discharge carrier (1) comprises of a substantially stripshaped member of rubber, synthetic rubber, plastic or similar flexible material with elastic properties, attachable against the object (2) in question by means of a layer of adhesive material (5), preferably protected by means of a removable protective tape (6) prior to mounting, the earth discharge carrier (1) being arranged to establish electric connection with the electrically conductive layer (7) applied against the object (2) by means of direct galvanic contact and/or capacitive coupling.

8 Claims, 2 Drawing Sheets

EARTH DISCHARGE CARRIER

The present invention relates to an earth discharge carrier, intended to be used in a device for damping and discharging electrostatical fields from monitor screens, keyboards and similar objects, and also for reducing existing magnetic fields emitted from a monitor screen.

It is previously known, for example with regard to a monitor screen, to apply an electrically conductive layer, which, even when dry, maintains electrically conductive properties, thereby achieving an antistatic layer, intended to prevent or reduce formation of an electrostatical field. It is also known, e.g. by SE-A-457 583, to combine such a layer with a surrounding metal spring earth discharge carrier, in order to improve the earth discharge carrying effect.

However, to use a metal spring, arranged surrounding a monitor screen and in contact with the electrically conductive layer applied against the screen surface, requires that supporting means for the metal spring first are applied against the screen surface, and also that the installation is performed by skilled personnel. The design is also not very attractive from aestethical point of view, and with regard to modern monitor screens, in which the substantial entirety of the monitor screen forms an actively used viewing surface, the outer portions can be hidden by the metal spring and/or the supporting means.

The present invention relates to a device of the above stated type, in which an earth discharge carrier is used which facilitates quick and simple installation by unskilled personnel, and in which the earth discharge carrier does not, as previously, reduce the effective and viewable area of the screen. The earth discharge carrier according to the present invention may also for example be used at a keyboard to facilitate earth connection of same, and for discharging electrostatical fields from the keyboard. The earth discharge carrier according to the present invention is used in a device intended to dampen and discharge electrostatical fields from a monitor screen, a keyboard or similar object, and also to reduce existing magnetic fields emitted from a monitor screen, the object from which discharge is intended to be carried out being given an electrically conductive layer by application of a substantially liquid antistatic medium, from which electric discharge to an earth connection point is carried out by means of an earth discharge carrier located adjacent to the layer, electrically connected to an earth connection point by means of an electric conductor connected to the earth discharge carrier, and it is mainly characterized in that the earth discharge carrier comprises of a substantially stripshaped member of rubber, synthetic rubber, plastic or similar flexible material with elastic properties, attachable against the object in question by means of a layer of adhesive material applied against the earth discharge carrier, preferably protected by means of a removable protective tape prior to mounting, the earth discharge carrier being arranged to establish an electric connection with the electrically conductive layer applied against the object by means of direct galvanic contact and/or capacitive coupling.

Examples of embodiments of an earth discharge carrier according to the present invention will be more fully described below with referense to the accompanying drawings, in which.

As previously discussed, it is known to apply a layer of a liquid or a semiliquid substance having electrically conductive properties against a monitor screen or other object, which maintains the electrically conductive properties also when the layer has dried. For this purpose commercially available so called antistatic liquids are used, which as active components include suitable salts, e.g. ammonium salts of type n-alkyl dimethyl, n-alkyl benzyl or n-alkyl dimethyl ethyl benzyl. To apply such a layer in a known way by wiping the surface in question, for example using a wet sachet impregnated with the antistatic medium, causes a certain degree of reduction with regard to existing electrostatical fields, and also magnetical fields. Application of such means can obviously also be performed in other ways than wiping, e.g. by spray application.

Figure 1:
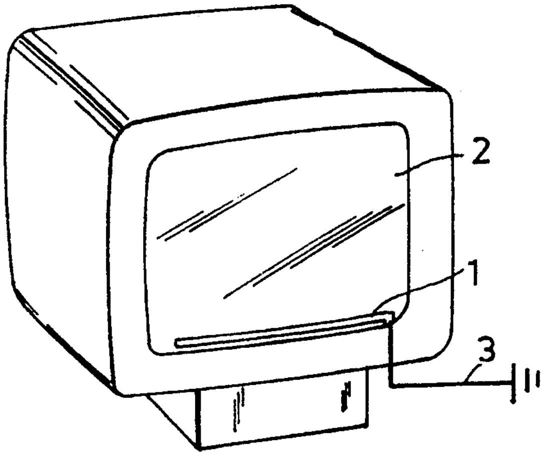
FIG. 1 is a perspective view of a monitor screen, including an earth discharge carrier according to the invention.

According to the present invention, an earth discharge carrier 1 is also attached against the surface from which discharge is intended, and an example of this is shown with reference to FIG. 1, which shows a monitor screen 2, having an earth discharge carrier 1 arranged adjacent to an outer edge portion. The earth discharge carrier 1 further includes an electric conductor 3, intended to be connected to a suitable earth connection point.

According to this embodiment, the earth discharge carrier 1 comprises a stripshaped member of an electrically conductive flexible material, such as rubber, synthetic rubber, plastic or similar, which is of an electrically conductive type. As shown more in detail in FIG. 2, the earth discharge carrier used in FIG. 1 includes a substantially rectangular member having a longitudinally extending ribshaped member 4, thereby forming a substantially L-shaped cross-section. The surface of the rectangular part of the earth discharge carrier 1 which is located adjacent to the ribshaped member 4 is coated with an adhesive preparation 5, which is protected by a removable protective tape 6.

Figure 2:
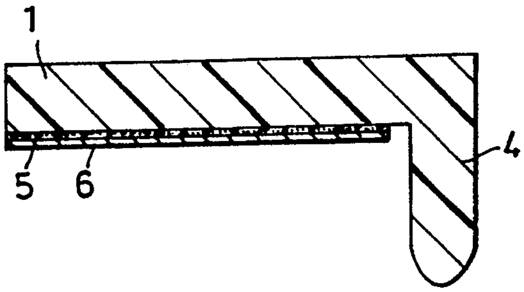
FIG. 2 is a cross-sectional view, and in enlarged scale, of an earth discharge carrier suitable for use according to FIG. 1.
Figure 3:
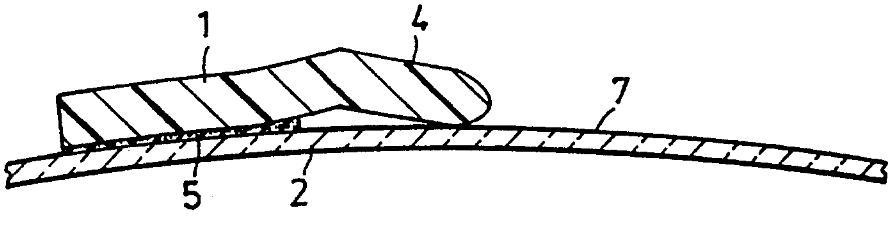
FIG. 3 is a view corresponding to FIG. 2, but with the earth discharge carrier applied against the monitor screen.

FIG. 3 shows a cross-sectional view of the earth discharge carrier 1 described with reference to FIG. 2, applied against the outer surface of a monitor screen 2 in a fashion as exemplified in FIG. 1. During application, the removable protective tape 6 has as a primary step been removed, whereafter the earth discharge connector 1 has been pressed against the surface of the monitor screen 2 with the plane from which the ribshaped member 4 extends.

As shown, the ribshaped member 4 has thereby become slightly deflected, and same has thus established contact between the adhesively coated 5 part of the earth discharge carrier 1 and the surface of the monitor screen 2. Since the earth discharge carrier 1 is formed from a material having elastical properties, the ribshaped member 4 is after application pressed hard against the surface of the monitor screen 2. An extremely good contact is hereby established between the ribshaped member 4 and the monitor screen 2, and with adjustment to the shape of the attachment surface. As a successively following operation, an antistatical electrically conductive layer 7 is thereafter applied against the monitor screen 2, e.g. by wiping the surface of the monitor screen 2 with a liquid and air-drying medium of previously discussed type, same forming a layer 7 in contact with the earth discharge carrier 1 and its ribshaped member 4. The earth discharge carrier 1 is assumed to be connected by means of the electrical conductor 3 to a suitable earth connection point.

According to the embodiment discussed above, the ribshaped member 4 thus establishes direct electric contact against the surface of the monitor screen 2, and against thereto applied electrically conductive antistatical layer 7. It is thus avoided that the adhesive medium 5 used, which normally has poor electric conductive properties, negatively influences the electric contact between the earth discharge connector 1 and the layer 7.

Figure 4:
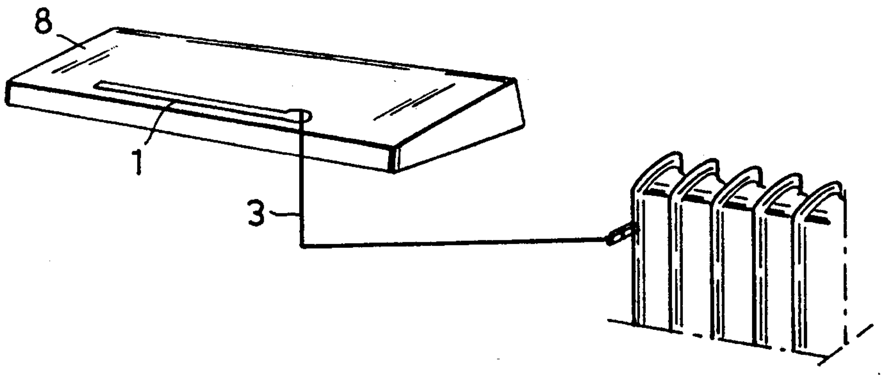
FIG. 4 is a perspective view of a keyboard with an earth discharge carrier for electrostatical fields according to the invention.
Figure 5:
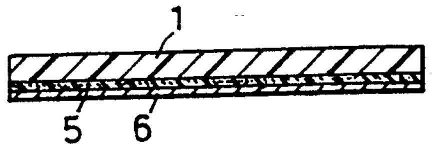
FIG. 5 is a cross-sectional view, and in enlarged scale, of an embodiment of an earth discharge carrier suitable for use according to FIG. 4.

As shown in FIG. 4, the present invention can also be used to discharge static electricity from, for example, a keyboard 8. In a suitable location at the keyboard 8, a stripshaped earth discharge carrier 1 is attached, having an attachment surface coated by an adhesive medium 5, which prior to application is covered by a removable protective tape 6. For this type of use, a more simple type of earth discharge carrier 1 can be used, e.g. as exemplified in FIG. 5. According to this embodiment, the earth discharge carrier 1 comprises of a stripshaped member having a larger width, which is possible for this type of application, since the earth discharge carrier 1 does not negatively influence any area to be utilized by a user. When the earth discharge carrier i has been applied in a suitable location, and associated electric conductor 3 has been connected to an earth connection point, the keyboard 8 and attached earth discharge carrier 1 are wiped over with an electrically conductive antistatical medium, thus forming a surrounding and air drying external layer 7, which electrically connect the external surfaces of the keyboard 8 and the earth discharge carrier 1.

In particular with regard to monitor screens 2, the earth discharge carrier 1 described with reference to FIGS. 2 and 3 can be further modified. Apart from direct contact between the earth discharge carrier 1 and applied layer 7, there is also a further possibility.

Existing electrostatical and magnetical fields by a monitor screen 2 do not have a constant strength, but vary continously in frequency. This fact also facilitates discharge by means of capacitive coupling between an electrically conductive layer 7 applied against the surface of a monitor screen 2 and an earth discharge carrier. Practical tests have shown, that very good discharge to earth can also be accomplished with an earth discharge carrier 1 which does not have direct galvanic contact with the layer 7, provided that the earth discharge carrier 1 includes a layer having good electric conductive properties, located adjacent, but electrically insulated, in relation to the layer 7 applied against the monitor screen 2, whereby the earth discharge carrier basically forms an electric capacitor, which by means of capacitive coupling accomplishes desired discharge to earth.

Figure 6:
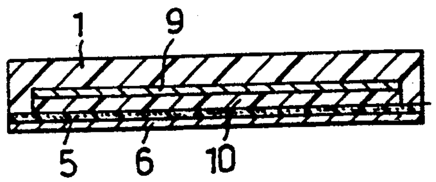
FIG. 6 is a view corresponding to FIG. 5 of a further embodiment of an earth discharge carrier, suitable for use by a monitor screen.

A basic example of an embodiment as disclosed above is shown in FIG. 6, and includes a thin bladeshaped member 9, e.g. of silver or any other material having good electric conductive properties, an adjacent layer 10 of a material having electrically insulating properties, against which a layer of adhesive material 5 is applied, protected by means of a removable protective tape 6 prior to the operation in which the earth discharge carrier 1 is mounted against a monitor screen 2. In this embodiment, the earth discharge carrier also includes a surrounding layer of rubber, synthetic rubber, plastic or other suitable material, which obviously can be excluded for certain applications.

Figure 7:
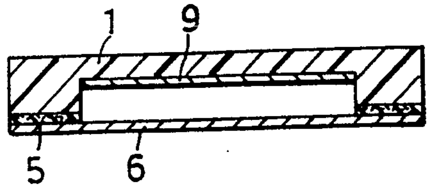
FIG. 7 is a view corresponding to FIG. 5, disclosing a further modified embodiment suitable for use by a monitor screen.

In those cases that such a surrounding layer is used, an earth discharge carrier 1 with capacitive coupling can also be accomplished in which the layer of electrically insulating material 10 comprises an air gap, and an example of this is shown in FIG. 7.

The earth discharge carrier 1 comprises here of a preferably U-shaped section, e.g. manufactured from rubber, synthetic rubber, plastic or similar. The internal bottom portion of the U-shaped member 1 is coated with a layer 9 of a material having good electric conductive properties, which alternatively may be a layer applied directly against said bottom portion, or, for example, a thin bladeshaped member, which is held in a position embraced by the section. Between said electric conductive layer 9 and the free end portions of the section exists a gap, which prevents direct contact against the surface of a monitor screen 2. The outer portions of the legs of the section are coated with an adhesive material 5, protected by a removable tape 6.

In the embodiments described with reference to FIGS. 6 and 7, it is obviously a requirement that the electrically conductive layer 9 is connected to an electric conductor 3, intended to facilitate connection to a suitable earth connection point. When mounted, application of the electrically conductive antistatic layer 7 is preferably performed as an initial operation, whereafter same is allowed to dry. Thereafter, the protective tape 6 is removed, and the earth discharge carrier used is attached against the dry layer 7. The part of the layer 7 which will be located underneath the earth discharge carrier i is protected by same, and maintained intact, and during successively following new application operations of antistatic medium against the surface of the monitor screen 2, for maintenance purposes, such new layers will receive electric contact with previously applied layer 7 beneath the earth discharge carrier 1.

The embodiments shown and described are only intended to serve as examples of embodiments within the scope of the inventive thought and the following claims, and may obviously be further modified, as well as combined. A combined galvanic/capacitive discharge to earth can thus also be accomplished, e.g. by combining the embodiments given as examples with reference to FIGS. 6 and 7 with the embodiment of FIGS. 2 and 3. Furthermore, the latter embodiment can also be arranged having a different cross-sectional configuration than the shown and substantially L-shaped configuration, e.g. with a further ribshaped member extending outwardly, thus forming a substantially U-shaped cross-sectional configuration. Furthermore, the layer of adhesive medium 5 used for attachment of the earth discharge carrier 1 can be a layer applied during manufacture, or alternatively a layer of glue or other adhesive medium applied by the user in connection with the mounting operation.

I claim:

1. A carrier device for discharging electrostatic fields from a surface of an item of electronic equipment which has an electrically conductive layer applied over said surface, the device comprising a strip of flexible electrically conducting material having elastic properties, adhesive means adhering a first part of the strip to said surface, a second part of the strip having direct galvanic contact with said electrically conductive layer, and an electrical conductor connecting the strip to an earth connection point.

2. A carrier device as claimed in claim 1, wherein the strip comprises a material selected from a group consisting of conductive rubber, synthetic rubber and plastic.

3. A carrier device as claimed in claim 1, wherein said second part of the strip is angled with respect to said first part of the strip and is elastically deformed into contact with said surface.

4. A carrier device for discharging electrostatic fields from a surface of an item of electronic equipment which has an electrically conductive layer applied over said surface, the device comprising a strip of flexible electrically conductive material having elastic properties, adhesive means adhering a first part of the strip to said surface, means providing capacitive coupling between a second part of the strip and said conductive layer, and an electrical conductor connecting the strip to an earth connection point.

5. A carrier device as claimed in claim 4, wherein the means providing capacitive coupling between the second part of the strip and said conductive layer comprises an electrically conducting element on the second part of the strip and an insulating means between said element and said conductive layer.

6. A carrier device as claimed in claim 5, wherein the insulating means comprises a layer of insulating material.

7. A carrier device as claimed in claim 5, wherein the insulating means comprises an air gap.

8. A carrier device as claimed in claim 4, wherein the electrically conducting element comprises a layer of silver.

* * * * *